United States Patent

Maeda et al.

Patent Number: 5,330,542
Date of Patent: Jul. 19, 1994

[54] DYE-INCORPORATED COMPOSITION

[75] Inventors: Shuichi Maeda, Hidaka; Satoru Imamura; Kazuo Mitsuhashi, both of Machida; Takako Tsukahara, Sagamihara, all of Japan

[73] Assignee: Mitsubishi Kasei Corporation, Tokyo, Japan

[21] Appl. No.: 809,513

[22] PCT Filed: May 22, 1991

[86] PCT No.: PCT/JP91/00677

§ 371 Date: Jan. 24, 1992

§ 102(e) Date: Jan. 24, 1992

[87] PCT Pub. No.: WO91/18950

PCT Pub. Date: Dec. 12, 1991

[30] Foreign Application Priority Data

May 25, 1990 [JP] Japan .................... 2-136844
Nov. 28, 1990 [JP] Japan .................... 2-328423

[51] Int. Cl.$^5$ ............ C09B 11/00; C09B 11/02; C09B 57/04; C09B 67/22; C09B 67/42
[52] U.S. Cl. ............................ 8/639; 8/638; 106/622 R; 106/23 R; 106/23 H; 106/23 L; 106/493; 106/494; 106/496; 534/573; 534/693; 534/728; 534/703; 534/707; 534/710; 534/711; 548/468
[58] Field of Search .............. 534/728, 573 M, 693; 106/52, 23; 8/638, 639

[56] References Cited

U.S. PATENT DOCUMENTS

| | | | |
|---|---|---|---|
| 1,983,045 | 12/1932 | Payne et al. | 534/728 |
| 2,841,576 | 7/1958 | Zickenpraht et al. | 534/728 |
| 2,922,690 | 1/1960 | Mueller et al. | 534/728 X |
| 3,114,726 | 12/1963 | Conger et al. | 534/728 X |
| 3,406,162 | 10/1968 | Neier | 534/693 X |
| 3,600,373 | 8/1971 | Zickendraht et al. | 534/728 X |
| 3,691,187 | 9/1972 | Gray | 534/728 |
| 4,204,879 | 5/1980 | Paskins et al. | 534/693 X |
| 4,395,288 | 7/1983 | Eida et al. | 534/728 X |
| 5,231,173 | 7/1993 | Murayama et al. | 534/704 |

FOREIGN PATENT DOCUMENTS

| | | | |
|---|---|---|---|
| 58-222156 | 12/1983 | Japan | 534/693 |
| 62-30090 | 2/1987 | Japan | 534/728 |
| 4-81162 | 3/1992 | Japan . | |
| 5-188491 | 5/1993 | Japan . | |

OTHER PUBLICATIONS

Abstract (BASIC): JP 4361088 A, Dec. 14, 1992.
Abstract (BASIC): JP 4308791 A, Oct. 30, 1992.
Abstract (BASIC): JP 4202260 A, Jul. 23, 1992.
Abstract (BASIC): JP 4046186, Feb. 17, 1992.
Japanese Patents Gazette, week 8604, Mar. 5, 1986, p. 24, No. J86025824-B, & JP-A-60249142, Dec. 9, 1985.
Japanese Patents Gazette, week 8604, Mar. 5, 1986, p. 24, No. J86025825-B, & JP-A-60249143, Dec. 9, 1985.

(List continued on next page.)

*Primary Examiner*—Floyd D. Higel
*Attorney, Agent, or Firm*—Oblon, Spivak, McClelland, Maier & Neustadt

[57] ABSTRACT

A dye-incorporated composition which comprises a cyanine type dye and an azo metal chelate compound comprising an azo type compound of the following formula (I):

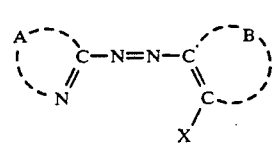

(wherein A is a residue forming a hetero ring together with the carbon atom and the nitrogen atom to which it is bonded, B is a residue forming an aromatic ring or a hetero ring together with the two carbon atoms to which it is bonded, and X is a group having an active hydrogen), and a metal, and an optical recording medium comprising a recording layer which contains the dye-incorporated composition.

8 Claims, No Drawings

OTHER PUBLICATIONS

Patent Abstracts of Japan, vol. 14, No. 224 (M-972) (4167), May 11, 1990, & JP-A-2 055 189, H. Mori, et al., "Optical Recording Medium", Feb. 23, 1990.

Patent Abstracts of Japan, vol. 13, No. 225 (M-830) (3573), May 25, 1989, & JP-A-1 040 389, E. Hamada et al., "Optical Data Recording Medium", Feb. 10, 1989.

Japanese Patents Gazette, week 8516, May 29, 1985, p. 16, No. J8509627-B, & JP-A-60044390, Mar. 9, 1985.

Hamada et al., Chemical Abstracts, vol. 111, #48258c (1989).

Ichnose et al., Chemical Abstracts, vol. 114, #111948g (1991).

Kanno et al., Chemical Abstracts, vol. 107 #68133d (1987).

Mori et al., Chemical Abstracts, vol. 113, #142417s (1990).

Ricoh I, Chemical Abstracts, vol 99, #167102r (1983).

Ricoh II, Chemical Abstracts, vol.1 101, #181296y (1984).

TDK, Chemical Abstracts, vol. 102, #87717k (1985).

DYE-INCORPORATED COMPOSITION

TECHNICAL FIELD

The present invention relates to a dye-incorporated composition comprising a cyanine type dye and an azo metal chelate compound, and an optical recording medium using it, more particularly, to a dye-incorporated composition which shows an absorption within the range of from 600 to 800 nm and has excellent light fastness and moisture resistance, useful for various optical recording media, electro-photosensitive materials, color liquid crystal display materials, light beam cut filters or the like, and an optical recording medium using it.

BACKGROUND ART

An optical recording medium employing laser makes storage and reproduction of high density information records possible, and its development have been remarkable recent years.

As an example of the optical recording medium, an optical disc may be mentioned. In general, an optical disc is usually designed to irradiate a focused laser beam of about 1 μm, to a thin recording layer formed on a substrate of disc shape to conduct high density information recording. The recording is carried out in such a manner that upon absorption of the layer beam energy, the irradiated portion of the recording layer will undergo a thermal deformation such as decomposition, evaporation or melting. Reproduction of the recorded information is carried out by reading the difference in the reflectance between the portion having a deformation formed by the laser beam and the portion having no such deformation.

Accordingly, an optical recording medium is required to efficiently absorb the energy of the laser beam, and also required to have a predetermined amount of absorbed light to a laser beam having a specific wavelength employed for recording and to be high in the reflectance to a laser beam having a specific wavelength employed for reproduction for accurately conducting the reproduction of information.

As the optical recording medium of this kind, there have been proposed ones comprising an organic dye thin film formed on a substrate. Since it is possible to form the organic dye thin film by coating, its mass productivity is high and the cost is expected to be low.

It has been known that a thin film containing the cyanine type dye is employed as the organic dye thin film (reference can be made with Japanese Unexamined Patent Publications No. 112790/1983, No. 114989/1983, No. 85791/1984 and No. 83236/1985). However, the optical recording medium comprising such a cyanine type dye is poor in the light stability, and has a problem in the storage stability and a drawback such that it is prone to light deteriorating upon reproduction. Thus, Japanese Unexamined Patent Publications No. 55795/1984, NO. 40389/1989, No. 55189/1990, No. 68742/1990, etc. propose to add various metal chelate compounds represented by the following structural formula (1), (2), (3) or (4), to the cyanine type dye to improve the light stability. However, the improvement is still on an insufficient level.

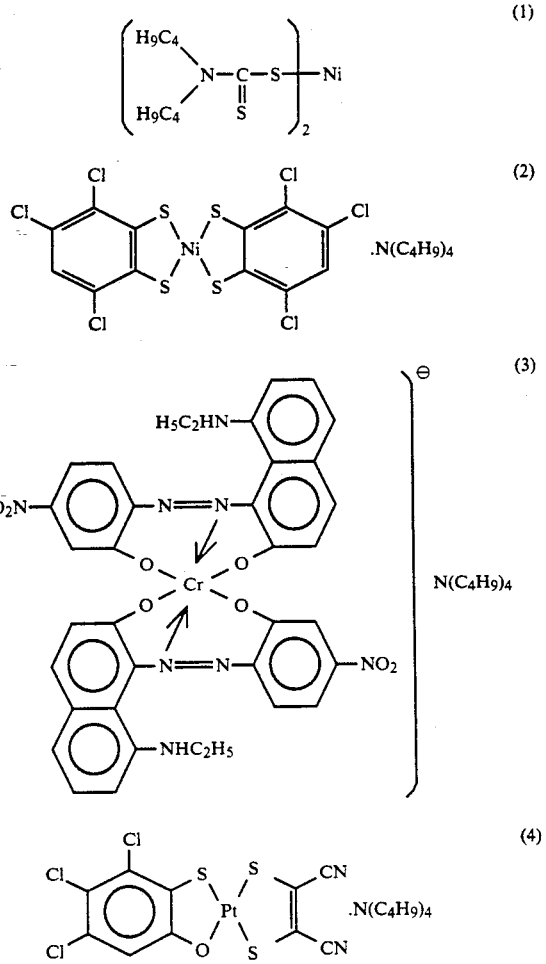

DISCLOSURE OF THE INVENTION

The present invention relates to a dye-incorporated composition which comprises a cyanine type dye and a metal chelate compound comprising an azo type compound of the following formula (I):

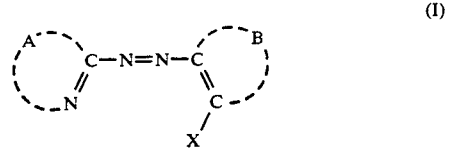

(wherein A is a residue forming a hetero ring together with the carbon atom and the nitrogen atom to which it is bonded, B is a residue forming an aromatic ring or a hetero ring together with the two carbon atoms to which it is bonded, and X is a group having an active hydrogen), and a metal, and an optical recording medium using it.

Namely, an object of the present invention is to provide a dye-incorporated composition containing a cyanine type dye and an azo metal chelate compound, which is excellent in the light fastness and moisture resistance as a dye for various chemical information materials such as optical recording media, and suitable to spin coating, and to provide an optical recording medium, which has the composition in its recording layer, being excellent in the light stability and causing no light deterioration upon reproduction.

Now, the present invention will be described in detail.

In the azo type compound of the formula (I), A is a residue forming a nitrogen-containing hetero ring together with the carbon atom and the nitrogen atom to which it is bonded, and the hetero ring is specifically a thiazole ring, a benzothiazole ring, a pyridobenzothiazole ring, a benzopyridothiazole ring, a pyridothiazole ring, a pyridine ring, a quinoline ring or the like. These nitrogen-containing hetero rings may have a substituent such as an alkyl group, an alkoxy group, an aryloxy group, an aralkyl group, an aryl group, a halogen atom, a cyano group, a nitro group, an ester group, a carbamoyl group, an acyl group, an acylamino group, a sulfamoyl group, a sulfonamide group, an amino group, a hydroxyl group, a phenylazo group, a pyridinoazo group or a vinyl group. These substituents may further have a substituent. Among the substituents of the nitrogen-containing hereto rings, preferred is a $C_{1-25}$ alkyl group which may have a substituent, a $C_{1-25}$ alkoxy group which may have a substituent, a halogen atom, a cyano group, a nitro group, a $C_{1-25}$ alkylsulfamoyl group which may have a substituent, a $C_{6-30}$ phenylsulfamoyl group which may have a substituent, a phenylazo group which may have a substituent, a pyridinoazo group which may have a substituent, a $C_{2-26}$ ester group, a $C_{2-26}$ carbamoyl group, a $C_{2-26}$ acyl group, a $C_{1-25}$ acylamino group, a $C_{1-25}$ sulfonamide group, $-NR^9R^{10}$ ($R^9$ and $R^{10}$ which are independent from each other, is a hydrogen atom, a $C_{1-25}$ alkyl group which may have a substituent or a phenyl group which may have a substituent, and $R^9$ and $R^{10}$ may form a 5-membered ring or a 6-membered ring each together), a hydroxyl group, $-CR^{11}=C(CN)R^{12}$ ($R^{11}$ is a hydrogen atom or a $C_{1-6}$ alkyl group and $R^{12}$ is a cyano group or a $C_{2-7}$ alkoxycarbonyl group) or the like.

In the azo type compound of the formula (I), B is a residue forming an aromatic ring or a hereto ring together with the two carbon atoms to which it is bonded, and is specifically a benzene ring, a naphthalene ring, a pyridine ring, a pyridone ring, a tetrahydroquinoline ring, a pyrazole ring or the like. The aromatic rings or the hetero rings may have a substituent, and such a substituent is an alkyl group, an alkoxy group, an aryloxy group, an aralkyl group, an aryl group, a halogen atom, a cyano group, a nitro group, an ester group, a carbamoyl group, an acyl group, an acylamino group, a sulfamoyl group, a sulfonamide group, an amino group, a hydroxyl group, a phenylazo group, a pyridinoazo group, a vinyl group or the like. These substituents may further have a substituent. Among the substituents on these aromatic rings or hetero rings, preferred is a $C_{1-25}$ alkyl group which may have a substituent, a $C_{1-25}$ alkoxy group which may have a substituent, a halogen atom, a cyano group, a nitro group, a $C_{1-25}$ alkylsulfamoyl group which may have a substituent, a $C_{6-30}$ phenylsulfamoyl group which may have a substituent, a phenylazo group which may have a substituent, a pyridinoazo group which may have a substituent, a $C_{2-26}$ ester group, a $C_{2-26}$ carbamoyl group, a $C_{2-26}$ acyl group, a $C_{1-25}$ acylamino group, a $C_{1-25}$ sulfonamide group, $-NR^9R^{10}$ (each of $R^9$ and $R^{10}$ which are independent from each other, is a hydrogen atom, a $C_{1-25}$ alkyl group which may have a substituent or a phenyl group which may have a substituent, and $R^9$ and $R^{10}$ may form a 5-membered ring or a 6-membered ring each together ), a hydroxyl group, $-CR^{11}=C(CN)R^{12}$ ($R^{11}$ is a hydrogen atom or a $C_{1-6}$ alkyl group and $R^{12}$ is a cyano group or a $C_{2-7}$ alkoxycarbonyl group) or the like.

In the azo type compound of the formula (I), X is not particularly limited so far as it is a group having an active hydrogen, but preferably $-OH$, $-COOH$, $-SO_3H-$, $-B(OH)_2$, $-HNSO_2R^{13}$ ($R^{13}$ is a hydrogen atom, a $C_{1-25}$ alkyl group which may have a substituent or a phenyl group which may have a substituent), $-CONH_2$, $-SO_2NH_2$, $-NH_2$ or the like. Particularly preferred are $-OH$, $-COOH$, $-SO_3H$, $-HNSO_2R^{13}$ ($R^{13}$ is as defined above). In the instance where X is a group which dissociates in anions such as $-COOH$, $-OH$, $-SO_3H$, etc., in the formation of the azo metal chelate compound, the azo type compound may be used as such, but may be used in the form of a salt with a cation. As such a cation, inorganic cations such as $Na^+$, $Li^+$, $K^+$ or the like and organic type cations such as

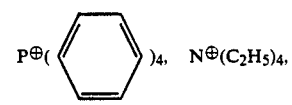

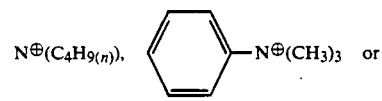

the like may be mentioned. Among the azo type compounds of the formula (I), preferred is an azo type compound of the following formula (III ):

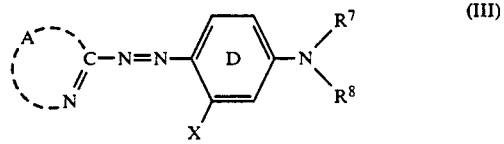

(wherein $R^7$ and $R^8$ which are independent from each other, is a hydrogen atom, an alkyl group which may have a substituent, an aryl group which may have a substituent, an alkenyl group which may have a substituent or a cycloalkyl group which may have a substituent, A and X are as defined above, and the ring D may have a substituent). Among the azo type compounds of the formula (III), particularly preferred is an azo type compound of the formula (IV):

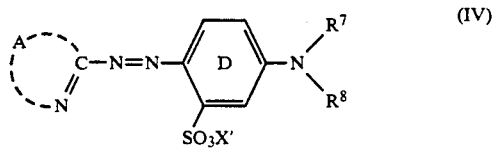

(wherein X' is a hydrogen atom or a cation, and $R^7 R^8$, A and ring D are as defined above):

As the substituents which may be substituted for the alkyl group, the aryl group, the alkenyl group or the cycloalkyl group which are represented by $R^7$ and $R^8$ in the formulas (III ) and ( IV), for example, an alkoxy group, an alkoxyalkyl group, an alkoxyalkoxyalkoxy group, an allyloxy group, an aryl group, an aryloxy group, a cyano group, a nitro group, a hydroxy group, a tetrahydrofuryl group, an alkylsulfonylamino group, a halogen atom and the like may be mentioned. In addition, as the substituents for the aryl group and cycloalkyl group, an alkyl group or a vinyl group may be mentioned. As the substituents which may be substituted for the ring D, an alkyl group, an alkoxy group, a halogen atom and the like may be mentioned.

Among the azo type compounds of the formula (I), another type of a preferred compound is an azo type compound of the following formula (V):

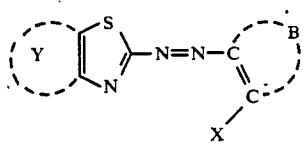

(V)

(wherein Y is a residue forming an aromatic ring or a hereto ring together with the thiazole ring to which it is bonded, and B and X are as defined above). Among the azo type compounds of the formula (III), particularly preferred is an azo type compound of the following formula (VI):

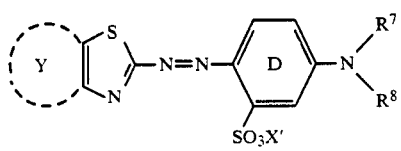

(VI)

(wherein X' is a hydrogen atom or a cation, and R 7 R$^8$, Y, ring D and X' are as defined above).

In the formulas (V) and (VI), Y is a residue forming an aromatic ring or a hetero ring together with the thiazole ring to which it is bonded, specifically a benzene ring, a naphthalene ring, an anthracene ring, a phenanthrene ring, a pyridine ring, a quinoline ring, a thiophene ring, a carbazole ring, a fluorene ring, an anthraquinone ring or the like. Such a residue Y may have thereon the same substituents as defined for the above A.

As the metals forming the chelate compounds together with the azo type compounds, there is no particular limitation so far as these are metals having an ability of forming the chelate compounds with the azo type compounds, but preferred are transition elements such as nickel (Ni) cobalt (Co), iron, ruthenium, rodium, palladium, copper, osmium, iridium or platinum, and particularly preferred are Ni and Co. These are used in the form of a salt such as Ni(CH$_4$COO)$_2$, NiCl$_2$, CoCl$_2$, Co(BF$_4$)$_2$ or Co(CH$_3$COO)$_2$ for the preparation, and obtained as a complex in which Ni$^{2+}$, Co$^{2+}$, Co$^{3+}$ or the like is coordinated.

The metal chelate compound of the azo compound employed in the present invention can be obtained according to the description of, for example, Furukawa; Analytica Chemica Acta 140 (1982) 281-289. For example, the metal chelate compound of the azo type compound of the formula (III) can be obtained by diazotizing an amino compound of the formula (VII):

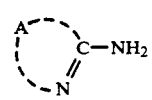

(VII)

(wherein A is as defined above) according to the ordinary methods, conducting a coupling with a substituted anilinesulfonate derivative of the following formula (VIII):

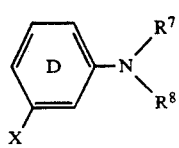

(VIII)

(wherein ring D, R$^7$, R$^8$ and X are as defined above) to obtain an azo type compound of the formula (III), and then reacting said azo type compound with a metal salt in water and/or an organic solvent such as dioxane, tetrahydrofuran, acetone or ethanol to obtain the metal chelate compound of the present invention.

As an anion of the metal salt to be used for the preparation of the metal chelate compound, preferred is a monovalent or divalent anion such as SCN$^-$, SbF$_6^-$, Cl$^-$, Br$^-$, F$^-$, ClO$_4^-$, BF$_4^-$, PF$_6^-$, CH$_3$COO$^-$, TiF$_6^{2-}$, SiF$_6^{2-}$, ZrF$_6^{2-}$,

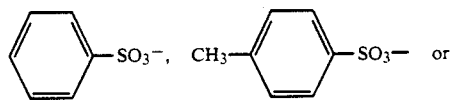

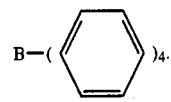

Particularly preferred is BF$_4^-$, PF$_6^-$ or CH$_3$COO$^-$.

As preferred specific examples of the chelate compound of the azo type compound and the metal employed for the dye-incorporated composition of the present invention, the azo metal chelate compounds as shown in the following Tables 1 to 9 may be mentioned.

TABLE 1

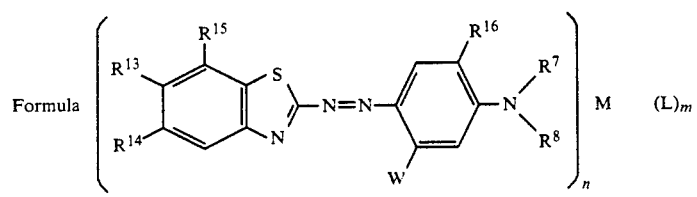

| Compound No. | R$^7$ | R$^8$ | R$^{13}$ | R$^{14}$ | R$^{15}$ | R$^{16}$ | W | M | L | n | m |
|---|---|---|---|---|---|---|---|---|---|---|---|
| 1 | —C$_2$H$_5$ | —C$_2$H$_5$ | —CH$_3$ | —H | —H | —H | —SO$_3^-$ | Ni$^{2+}$ | — | 2 | — |
| 2 | —C$_2$H$_5$ | —C$_2$H$_5$ | —CH$_3$ | —CH$_3$ | —H | —H | —SO$_3^-$ | Ni$^{2+}$ | — | 2 | — |

TABLE 1-continued

Formula $\left[\begin{array}{c}R^{15}\\R^{13}\\R^{14}\end{array}\text{benzothiazole}-N=N-\begin{array}{c}R^{16}\\ \\W\end{array}-N\begin{array}{c}R^7\\R^8\end{array}\right]_n M \quad (L)_m$

| Compound No. | R⁷ | R⁸ | R¹³ | R¹⁴ | R¹⁵ | R¹⁶ | W | M | L | n | m |
|---|---|---|---|---|---|---|---|---|---|---|---|
| 3 | —C₂H₅ | —C₂H₅ | —CH₃ | —H | —H | —OCH₃ | —SO₃⁻ | Ni²⁺ | — | 2 | — |
| 4 | —C₂H₅ | —C₂H₅ | phenyl-N=N— | —H | —H | —H | —SO₃⁻ | Ni²⁺ | — | 2 | — |
| 5 | —C₂H₅ | —C₂H₅ | pyridyl-N=N— | —H | —H | —H | —SO₃⁻ | Ni²⁺ | — | 2 | — |
| 6 | —CH₃ | —CH₃ | —CH₃ | —H | —H | —H | —COO⁻ | Ni²⁺ | — | 2 | — |
| 7 | —C₃H₇(n) | —C₃H₇(n) | —CH₃ | —H | —H | —H | —COO⁻ | Cu²⁺ | — | 2 | — |
| 8 | —C₂H₅ | —C₂H₅ | —CH₃ | —H | —H | —H | —COO⁻ | Co³⁺ | Cl⁻ | 2 | 1 |
| 9 | —C₂H₅ | —C₂H₅ | —OCH₃ | —H | —H | —H | —COO⁻ | Co³⁺ | BF₄⁻ | 2 | 1 |
| 10 | —C₂H₅ | —C₂H₅ | —CH₃ | —H | —H | —H | —SO₃⁻ | Co³⁺ | CH₃COO⁻ | 2 | 1 |
| 11 | —C₂H₅ | —C₂H₅ | —Br | —H | —H | —H | —COO⁻ | Cu²⁺ | — | 2 | — |
| 12 | —CH₃ | —CH₃ | —OC₂H₅ | —H | —H | —CH₃ | —SO₃⁻ | Ni²⁺ | — | 2 | — |

TABLE 2

Formula $\left[\text{pyrido-benzothiazole}-N=N-\begin{array}{c}R^{16}\\ \\W\end{array}-N\begin{array}{c}R^7\\R^8\end{array}\right]_n M \quad (L)_m$

| Compound No. | R⁷ | R⁸ | R¹⁶ | W | M | L | n | m |
|---|---|---|---|---|---|---|---|---|
| 13 | —C₂H₅ | —C₂H₅ | —H | —SO₃⁻ | Ni²⁺ | — | 2 | — |
| 14 | —C₂H₅ | —C₄H₉(n) | —H | —SO₃⁻ | Ni²⁺ | — | 2 | — |
| 15 | —C₂H₅ | —C₂H₅ | —OCH₃ | —SO₃⁻ | Ni²⁺ | — | 2 | — |
| 16 | —C₂H₅ | —C₂H₅ | —H | —SO₃⁻ | Co³⁺ | CH₃COO⁻ | 2 | 1 |

TABLE 3

Formula $\left[R^{19}\begin{array}{c}R^{20}\\ \\N\end{array}-N=N-\begin{array}{c}R^{16}\\ \\W\end{array}-N\begin{array}{c}R^7\\R^8\end{array}\right]_n M \quad (L)_m$

| Compound No. | R⁷ | R⁸ | R¹⁶ | R¹⁹ | R²⁰ | W | M | L | n | m |
|---|---|---|---|---|---|---|---|---|---|---|---|
| 17 | —C₂H₅ | —C₂H₅ | —H | —Br | —Br | —O⁻ | Ni²⁺ | — | 2 | — |
| 18 | —C₂H₅ | —C₂H₅ | —H | —Cl | —H | —O⁻ | Co³⁺ | Cl⁻ | 2 | 1 |
| 19 | —C₂H₅ | —C₂H₅ | —H | —Cl | —H | —O⁻ | Ni²⁺ | — | 2 | — |
| 20 | —C₃H₇(n) | —C₃H₇(n) | —H | —Br | —Br | —COO⁻ | Co²⁺ | — | 2 | — |
| 21 | —C₂H₅ | —C₂H₅ | —H | —Cl | —H | —O⁻ | Co³⁺ | BF₄⁻ | 2 | 1 |
| 22 | —C₃H₇(n) | —C₃H₇(n) | —H | —Br | —Br | —COO⁻ | Co³⁺ | CH₃COO⁻ | 2 | 1 |
| 23 | —C₂H₅ | —C₂H₅ | —H | —Br | —Br | —SO³⁻ | Co³⁺ | Cl⁻ | 2 | 1 |

TABLE 4

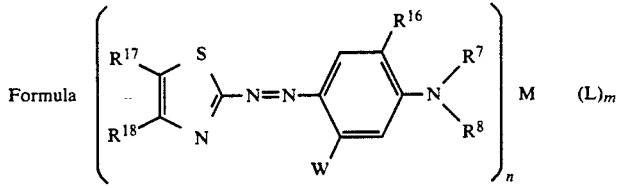

| Compound No. | R⁷ | R⁸ | R¹⁷ | R¹⁸ | R¹⁶ | W | M | L | n | m |
|---|---|---|---|---|---|---|---|---|---|---|
| 24 | —C$_2$H$_5$ | —C$_2$H$_5$ | —CH$_3$ | —H | —H | —COO⁻ | Ni$^{2+}$ | — | 2 | — |
| 25 | —C$_2$H$_5$ | —C$_2$H$_5$ | —CH$_3$ | (phenylazo) | —H | —SO$_3$⁻ | Ni$^{2+}$ | — | 2 | — |

TABLE 5

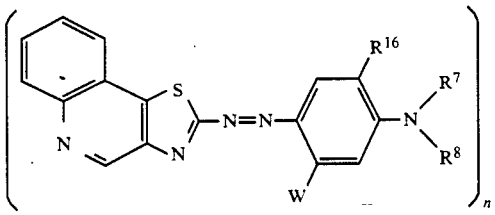

| Compound No. | R⁷ | R⁸ | R¹⁶ | W | M | L | n | m |
|---|---|---|---|---|---|---|---|---|
| 26 | —C$_2$H$_5$ | —C$_2$H$_5$ | —H | —COO⁻ | Ni$^{2+}$ | — | 2 | — |
| 27 | —C$_2$H$_5$ | —C$_2$H$_5$ | —H | —SO$_3$⁻ | Ni$^{2+}$ | — | 2 | — |

TABLE 6

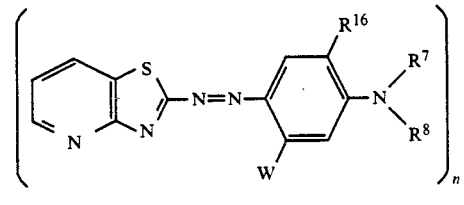

| Compound No. | R⁷ | R⁸ | R¹⁶ | W | M | L | n | m |
|---|---|---|---|---|---|---|---|---|
| 28 | —C$_2$H$_5$ | —C$_2$H$_5$ | —H | —SO$_3$⁻ | Ni$^{2+}$ | — | 2 | — |
| 29 | —C$_2$H$_5$ | —C$_2$H$_5$ | —H | —SO$_3$⁻ | Co$^{2+}$ | — | 2 | — |

TABLE 7

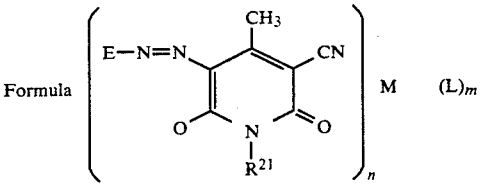

| Compound No. | E | R²¹ | M | L | n | m |
|---|---|---|---|---|---|---|
| 30 | (6-methylbenzothiazol-2-yl) | —C$_2$H$_5$ | Ni$^{2+}$ | — | 2 | — |
| 31 | (5-chloro-2-pyridyl) | —C$_3$H$_{7(n)}$ | Co$^{3+}$ | Cl⁻ | 2 | 1 |

TABLE 8

Formula: $\left( \begin{array}{c} \text{E—N=N} \\ \text{pyrazolone ring with R}^{22}\text{, phenyl-R}^{23} \end{array} \right)_n M (L)_m$

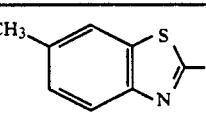

| Compound No. | E | R²² | R²³ | M | L | n | m |
|---|---|---|---|---|---|---|---|
| 32 | 6-methylbenzothiazol-2-yl | —CH₃ | —H | Ni²⁺ | — | 2 | — |
| 33 | 5-chloropyridin-2-yl | —CH₃ | —SO₂NHC₂H₅ | Co³⁺ | PF₆⁻ | 2 | 1 |

TABLE 9

Formula: $\left( \begin{array}{c} \text{E—N=N, naphthol with R}^{24} \end{array} \right)_n M (L)_m$

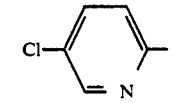

| Compound No. | E | R²⁴ | M | L | n | m |
|---|---|---|---|---|---|---|
| 34 | 6-methylbenzothiazol-2-yl | —SO₂NHC₂H₅ | Ni²⁺ | — | 2 | — |
| 35 | 5-chloropyridin-2-yl | —SO₂NHC₂H₅ | Co³⁺ | Cl⁻ | 2 | 1 |

As the cyanine type dye, any conventional ones may be employed, but particularly preferred is an indolenine type cyanine dye of the following formula (II):

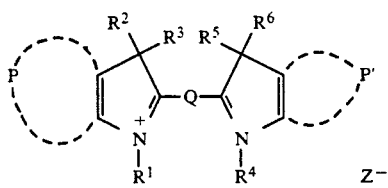

(II)

(wherein P and P' which are independent from each other, is a residue forming an aromatic ring together with the two carbon atoms to which it is bonded, Q is a pentamethine group which may have a substituent, each of $R^1$, $R^2$, $R^3$, $R^4$, $R^5$ and $R^6$ which are independent from each other, is an alkyl group which may have a substituent, an aryl group which may have a substituent, an alkenyl group which may have a substituent or a cycloalkyl group which may have a substituent, and $Z^-$ is an anionic residue). Such indolenine type cyanine dyes can be easily synthesized by a method described in, for example, Japanese Unexamined Patent Publications No. 112790/1983, 114989/1983, No. 85791/1984, No. 83236/1985 or the like.

The dye-incorporated composition of the present invention is comprised of the cyanine type dye and the metal chelate compound formulated at the ratio of 5:95 to 99:1, preferably 5:95 to 50:50 by weight.

The dye-incorporated composition of the present invention shows an absorption within the range of 600 to 800 nm and is excellent in the light fastness and the moisture resistance.

The dye-incorporated composition of the present invention can be employed for, for example, a recording layer of an optical recording medium. The optical recording medium usually produced is basically composed of a substrate and a recording layer containing a cyanine type dye and a metal chelate compound of an azo type compound, but, if necessary, a reflecting layer may be provided on the recording layer. Further, if necessary, a primer coating layer may be provided on the substrate, a protecting layer may be provided on the recording layer or the reflecting layer, and a surface protecting layer may be provided on the substrate at the opposite side to the recording layer (mirror surface side).

In the present invention, the substrate is preferably transparent to the laser beam to be employed. With respect to the material for the substrate, a support commonly used for recording material such as glass or plastic may be employed. From various aspects, plastic material is preferably used. As such plastic material, acryl resin, methacryl resin, vinyl acetate resin, vinyl chloride resin, nitro cellulose, polyethylene resin, polypropylene resin, polycarbonate resin, polyimide resin, epoxy resin or polysulfone resin may be mentioned.

Among them, an injection molded polycarbonate resin substrate is particularly preferably employed from the viewpoint of the high productivity, low cost and moisture resistance.

As the reflective layer, employed are metals such as gold, silver, copper, aluminum or platinum and alloys thereof which have high reflectance in the laser wavelength region to be employed.

As the protective layer, an ultraviolet curable acryl resin or a silicon type hard coating agent is employed.

As the surface protective layer on the mirror surface side of the substrate, an ultraviolet curable acryl resin or a silicon type hard coating agent is employed. The surface protecting layer is preferably provided with an antistatic' ability for preventing dust or the like from adhering.

The recording layer of the present invention containing the cyanine type dye and the metal chelate of the azo type compound has a film thickness of usually from 100 Å to 5 μm, preferably from 700 Å to 2 μm.

With respect to the layer-forming method, the layer may be formed by a commonly employed thin film-forming method such as a vacuum vapor deposition method, a sputtering method, a doctor blade method, a casting method, a spinner method or a dipping method. However, the spinner method is preferred from the viewpoint of the productivity and cost.

In the case of layer forming by a spinner method, the rotational speed is preferably from 500 to 5,000 rpm, and after spin coating, treatment such as heating or exposing to a solvent vapor, can be applied, as the case requires.

Further, a binder may be used as the case requires. As such a binder, a known binder such as polyivinyl alcohol, polyvinylpyrrolidone, nitrocellulose, cellulose acetate, ketone resin, polyvinylbutyral or polycarbonate, may be employed.

When a recording layer is formed by a coating method such as a doctor blade method, a casting method, a spinner method or a dipping method, particularly a spinner method, as the coating solvent, the one having a boiling point of from 120 to 160° C., such as tetrafluoropropanol, octafluoropentanol, tetrachloroethane, bromoform, dibromoethane, diacetone alcohol, ethyl cellosolve, xylene, 3-hydroxy-3-methyl-2-butanone, chlorobenzene, cyclohexanone or methyl lactate, is preferably employed.

Among them, for the injection molded polycarbonate resin substrate excellent in the high productivity, low cost and moisture resistance, as a solvent suitably useful without damaging the substrate, a ketone alcohol type solvent such as diacetone alcohol or 3-hydroxy-3-methyl-2-butanone; a cellosolve type solvent such as methyl cellosolve or ethyl cellosolve; a perfluoroalkyl alcohol type solvent such as tetrafluoropropanol or octafluoropentanol; or a hydroxyester type solvent such as methyl lactate or methyl isobutylate, may be mentioned.

The recording layer of the optical recording medium of the present invention may be formed on both sides of the substrate or on one side thereof.

Recording on an optical recording medium thus obtained, is conducted by irradiating a laser beam, preferably a semiconductor laser beam, focused to about 1 m to the recording layer provided on both sides of the substrate or on one side thereof. At the portion irradiated with the laser beam, a thermal deformation of the recording layer, such as decomposition, evaluation or melting, will be formed due to absorption of the laser energy.

Reproduction of the recorded information can be conducted by reading the difference in the reflectance between the portion having such a thermal deformation formed by a laser beam and the portion having no such a thermal deformation.

As the laser beam to be used for the optical recording medium of the present invention, $N_2$, He—Cd, At, $H_3$—Ne, ruby, a semiconductor or a dye laser, may be mentioned. However, a semiconductor laser is used particularly preferably from the viewpoint of light weight, convenience in handling and compactness.

BEST MODE FOR CARRYING OUT THE INVENTION

Now, the present invention will be described in detail with reference to examples. However, the present invention is by no means restricted to such Examples unless it exceeds its gist.

EXAMPLE 1

A mixture (weight ratio 70:30) of 0.28 g of an indolenine type cyanine dye of the following structural formula:

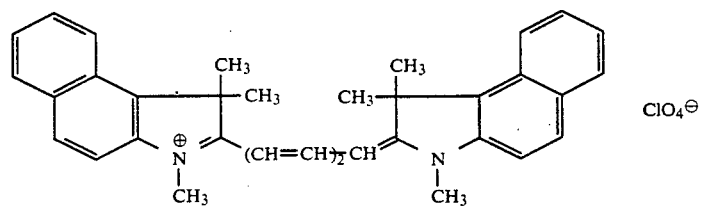

and 0.12 g of an azo metal chelate compound of the following structural formula (Compound No. 1 of the above Table 1):

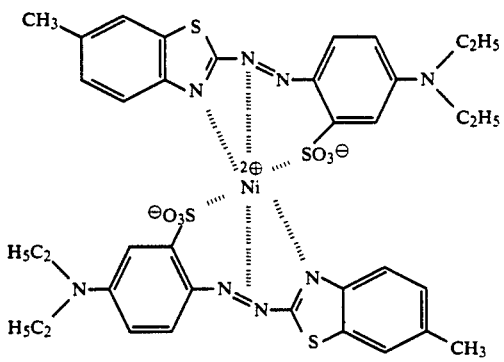

was dissolved in 40 g of octafluoropentanol to obtain a 1 wt % solution. This solution was dropped on an injection molded polycarbonate substrate having a diameter of 120 mm, a thickness of 1.2 mm, and a groove with a depth of 1,000 Å and a width of 0.7 μm, and coated thereon by a spinner method (a rotational speed of 500 rpm for 4 minutes). The coating was followed by drying at 80° C. for 5 minutes to form a recording layer.

Then, on the recording layer, a gold layer having a layer thickness of 2,000 Å was formed by a sputtering method as a reflecting layer. Further, on this reflecting layer, an ultraviolet curable resin was spin-coated, followed by irradiation with ultraviolet rays for curing to form a protecting layer having a thickness of 10 μm, to obtain an optical recording medium.

EFM modulating signals were recorded on the obtained optical recording medium with a semiconductor laser beam having a wavelength of 785 nm at a linear velocity of 1.4 m/s, and then reproduced. From the reproduced wave shape, a reflectance and a degree of lit modulation were measured. The degree of lit modulation represented by percentage, is a value obtained by dividing the signal amplitude of the longest recording pit by the reflectance.

Further, photo-deterioration accelerated test (test conditions; JIS standard L0843-1988, temperature 63±3° C., apparatus used for the test; Xenon Long Life Weather Meter manufactured by Suga Shikenki) was conducted by continuously irradiating a xenon light having an output of 2.5 kW with a distance of 25 cm, and then the reflectance and the degree of lit modulation were measured.

Further, a track on which EFM signals were recorded, was repeatedly reproduced 500,000 times with a laser beam having an output of 1.2 mW, and the reflectance and the degree of lit modulation were measured. The results are shown in Table 10.

EXAMPLE 2

An optical recording medium was obtained in the same manner as in Example 1 except that a dye of the following structural formula:

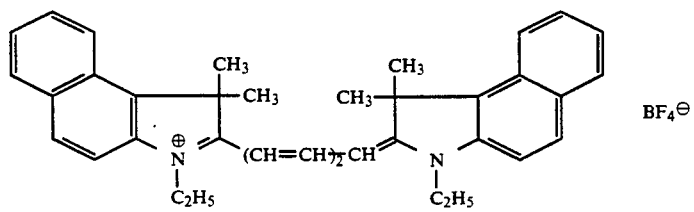

as an indolenine type cyanine dye, and a compound of the following structural formula (Compound No. 6 of Table 1):

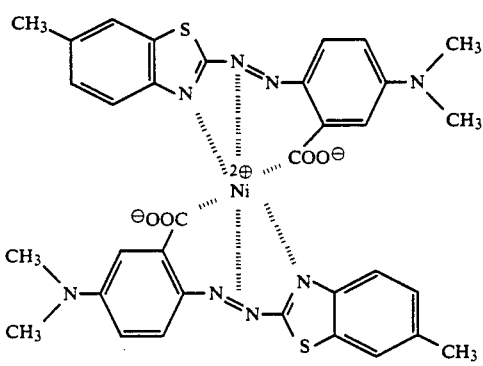

as an azo metal chelate compound were mixed at a weight ratio of 70:3 and used.

The reflectance and the degree of 11T modulation were measured in the same manner as in Example 1, and the results are shown in Table 10.

EXAMPLE 3

An optical recording medium was obtained in the same manner as in Example 1 except that a dye of the following structural formula:

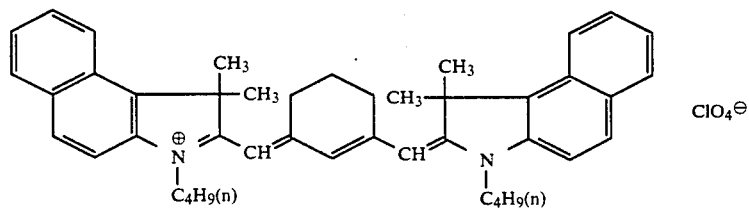

as an indolenine type cyanine dye, and a compound of the following structural formula (Compound No. 5 of Table 1):

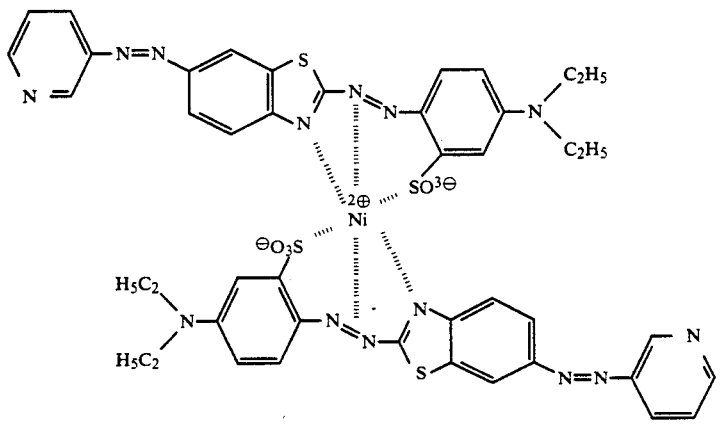

as an azo metal chelate compound were mixed at a weight ratio of 70:30 and used.

The reflectance and the degree of 11T modulation were measured in the same manner as in Example 1, and the results are shown in Table 10.

EXAMPLE 4

An optical recording medium was obtained in the same manner as in Example 1 except that a dye of the following structural formula:

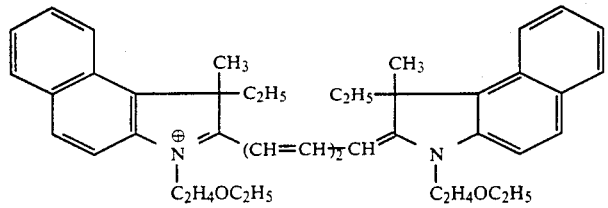

as an indolenine type cyanine dye, and a compound (Compound No. 13 of Table 2) of the following structural formula:

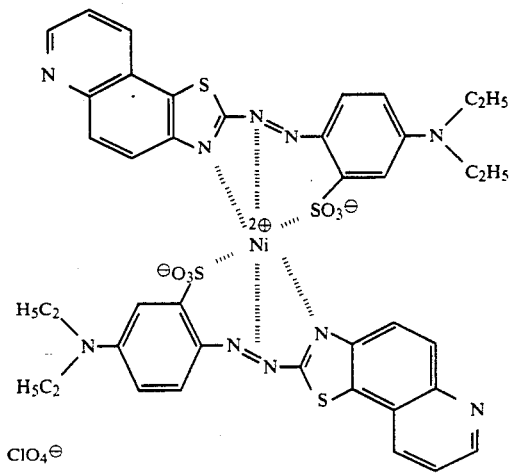

as an azo metal chelate compound were mixed at a weight ratio of 60:40 and used.

The reflectance and the degree of 11T modulation were measured in the same manner as in Example 1, and the results are shown in Table 10.

EXAMPLE 5

An optical recording medium was obtained in the same manner as in Example 1 except that a dye of the following structural formula:

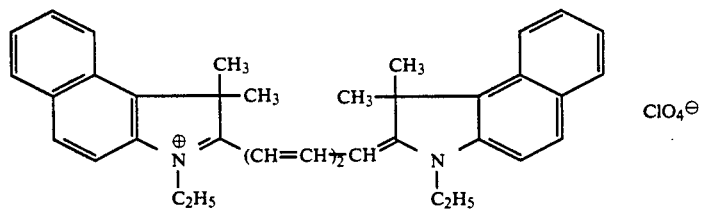

as an indolenine type cyanine dye, and a compound (Compound No. 19 of Table 3) of the following structural formula:

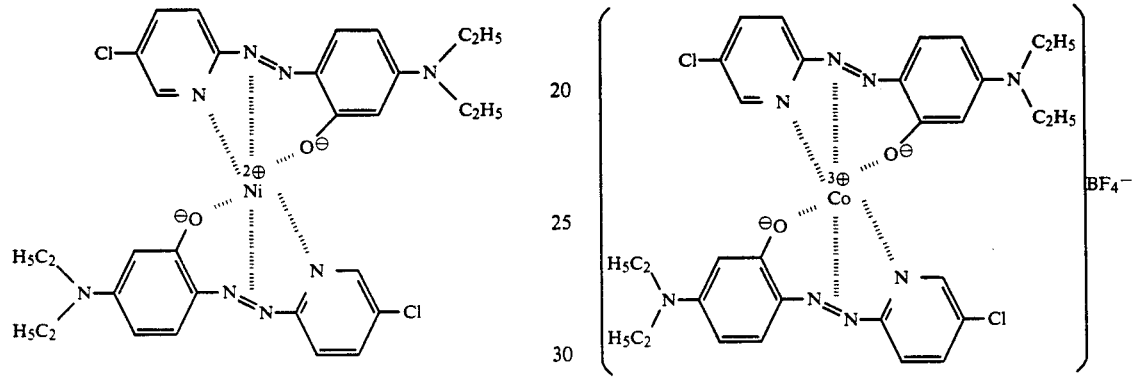

as an azo metal chelate compound were mixed at a weight ratio of 80:20 and used.

The reflectance and the degree of 11T modulation were measured in the same manner as in Example 1, and the results are shown in Table 10.

EXAMPLE 6

An optical recording medium was obtained in the same manner as in Example 1 except that a dye of the following structural formula:

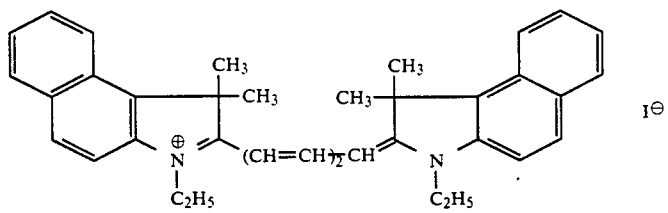

as an indolenine type cyanine dye, and a compound (Compound No. 21 of Table 3) of the following structural formula:

as an azo metal chelate compound were mixed at a weight ratio of 80:20 and used.

The reflectance and the degree of 11T modulation were measured in the same manner as in Example 1, and the results are shown in Table 10.

EXAMPLE 7

An optical recording medium was obtained in the same manner as in Example 1 except that a dye of the following structural formula:

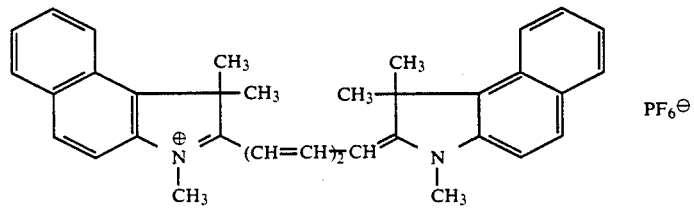

as an indolenine type cyanine dye, and a compound (Compound No. 22 of Table 3) of the following structural formula:

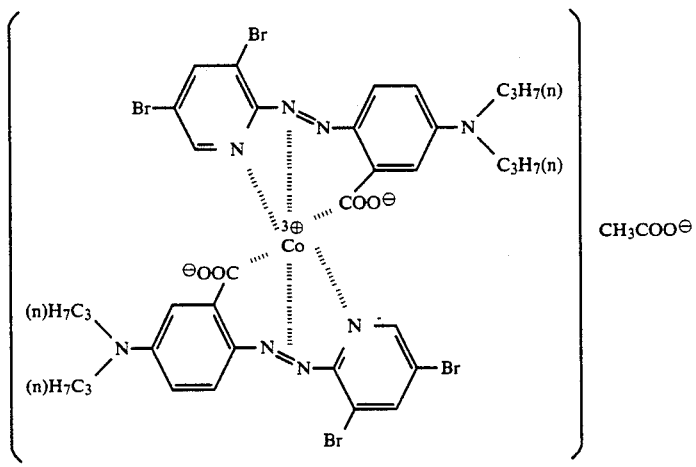

as an azo metal chelate compound were mixed at a weight ratio of 70:30 and used.

The reflectance and the degree of 11T modulation were measured in the same manner as in Example 1, and the results are shown in Table 10.

EXAMPLE 8

An optical recording medium was obtained in the same manner as in Example 1 except that a dye of the following structural formula:

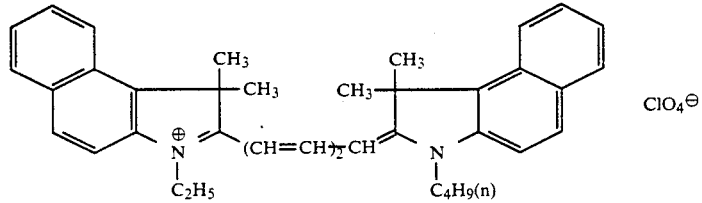

as an indolenine type cyanine dye, and a compound (Compound No. 30 of Table 7) of the following structural formula:

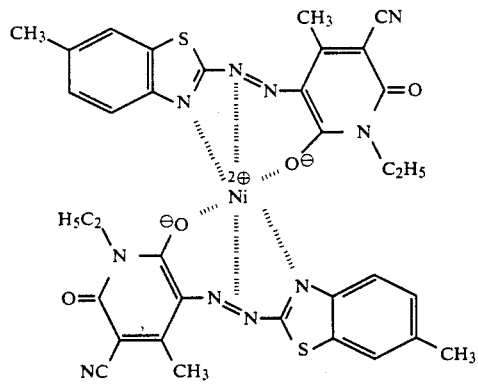

as an azo metal chelate compound were mixed at a weight ratio of 80:20 and used.

The reflectance and the degree of lit modulation were measured in the same manner as in Example 1, and the results are shown in Table 10.

EXAMPLE 9

An optical recording medium was obtained in the same manner as in Example 1 except that 26 g of methyl lactate was used instead of 40 g of octafluoropentanol as a coating solvent.

The reflectance and the degree of lit modulation were measured in the same manner as in Example 1, and the results are shown in Table 10.

EXAMPLE 10

An optical recording medium was obtained in the same manner as in Example 1 except that 23 g of 3-hydroxy-3-methyl-2-butanone was used instead of 40 g of octafluoropentanol as a coating solvent.

The reflectance and the degree of lit modulation were measured in the same manner as in Example 1, and the results are shown in Table 10.

COMPARATIVE EXAMPLE 1

An optical recording medium was produced in the same manner as in Example 1 except that a recording layer was formed by using only the indolenine type cyanine dye without using the azo metal chelate compound. The reflectance and the degree of lit modulation were measured in the same manner as in Example 1, and the results are shown in Table 10.

COMPARATIVE EXAMPLE 2

An optical recording medium was produced in the same manner as in Example 3 except that a recording layer was formed by using only the indolenine type cyanine dye without using the azo metal chelate compound. The reflectance and the degree of lit modulation were measured in the same manner as in Example 1, and the results are shown in Table 10.

COMPARATIVE EXAMPLE 3

An optical recording medium was produced in the same manner as in Example 5 except that a recording layer was formed by using only the indolenine type cyanine dye without using the azo metal chelate compound. The reflectance and the degree of lit modulation were measured in the same manner as in Example 1, and the results are shown in Table 10.

COMPARATIVE EXAMPLE 4

An optical recording medium was produced in the same manner as in Example 1 except that the indolenine type cyanine dye used in Example 1 and a metal chelate compound of the following structural formula:

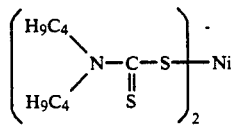

were mixed at a weight ratio of 70:30 and used. The reflectance and the degree of lit modulation were measured in the same manner as in Example 1, and the results are shown in Table 10.

TABLE 10

|  | Initial value | | After accelerated test | | After repeated reproduction | |
| --- | --- | --- | --- | --- | --- | --- |
|  | Reflectance (%) | Degree of modulation (%) | Reflectance (%) | Degree of modulation (%) | Reflectance (%) | Degree of modulation (%) |
| Example 1 | 71 | 70 | 78 | 66 | 76 | 68 |
| Example 2 | 69 | 67 | 74 | 62 | 73 | 65 |
| Example 3 | 65 | 67 | 75 | 63 | 73 | 65 |
| Example 4 | 70 | 69 | 78 | 66 | 73 | 67 |
| Example 5 | 67 | 63 | 76 | 61 | 74 | 62 |
| Example 6 | 66 | 64 | 75 | 60 | 71 | 61 |
| Example 7 | 66 | 66 | 72 | 65 | 70 | 65 |
| Example 8 | 72 | 65 | 81 | 62 | 73 | 64 |
| Example 9 | 71 | 69 | 77 | 66 | 74 | 68 |
| Example 10 | 70 | 70 | 78 | 65 | 77 | 69 |
| Comparative Example 1 | 75 | 72 | 88 | 34 | 84 | 45 |
| Comparative Example 2 | 74 | 69 | 86 | 29 | 83 | 50 |
| Comparative Example 3 | 76 | 72 | 90 | 31 | 85 | 52 |
| Comparative Example 4 | 73 | 70 | 87 | 48 | 82 | 59 |

EXAMPLE 11

A dye-incorporated composition (a weight ratio of 30:70) of 0.28 g a dye of the following structural formula:

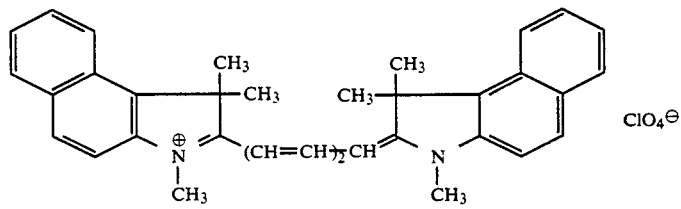

as an indolenine type cyanine dye, and 0.28 g of a compound of the following structural formula:

as an azo metal chelate compound, was dissolved in octafluoropentanol to obtain a 2 wt % solution. An optical recording medium was obtained in the same manner as in Example 1 by using the solution.

The reflectance and the degree of 11% modulation were measured in the same manner as in Example 1, and the results are shown in Table 11.

EXAMPLE 12

An optical recording medium was obtained in the same manner as in Example 11 except that a dye of the following structural formula:

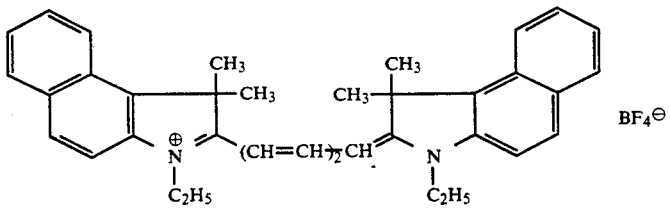

as an indolenine type cyanine dye, and a compound (Compound No. 6 of Table 1) of the following structural formula:

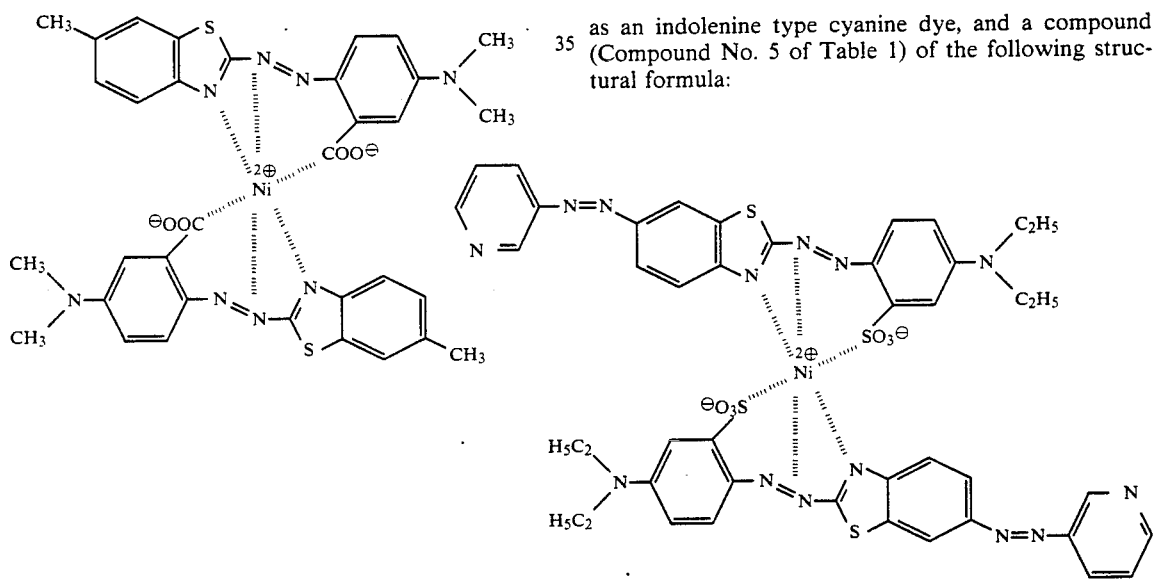

as an azo metal chelate compound were mixed at a weight ratio of 30:70 and used.

The reflectance and the degree of lit modulation were measured in the same manner as in Example 1, and the results are shown in Table 11.

EXAMPLE 13

An optical recording medium was obtained in the same manner as in Example 11 except that a dye of the following structural formula:

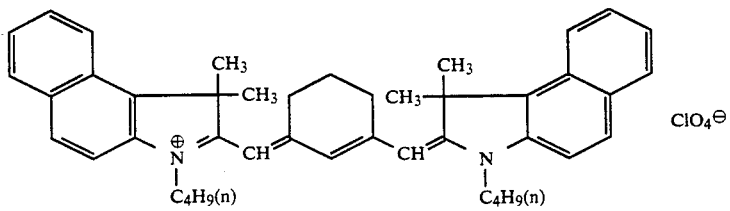

as an indolenine type cyanine dye, and a compound (Compound No. 5 of Table 1) of the following structural formula:

as an azo metal chelate compound were mixed at a weight ratio of 30:70 and used.

The reflectance and the degree of 11T modulation were measured in the same manner as in Example 1, and the results are shown in Table 11.

EXAMPLE 14

An optical recording medium was obtained in the same manner as in Example 11 except that a dye of the following structural formula:

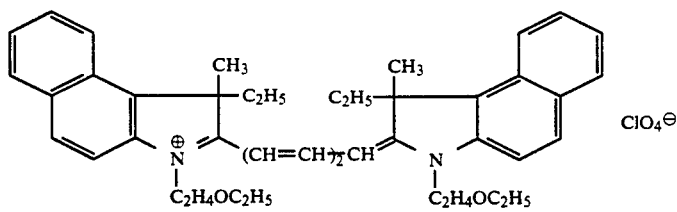

as an indolenine type cyanine dye, and a compound (Compound No. 13 of Table 2) of the following structural formula:

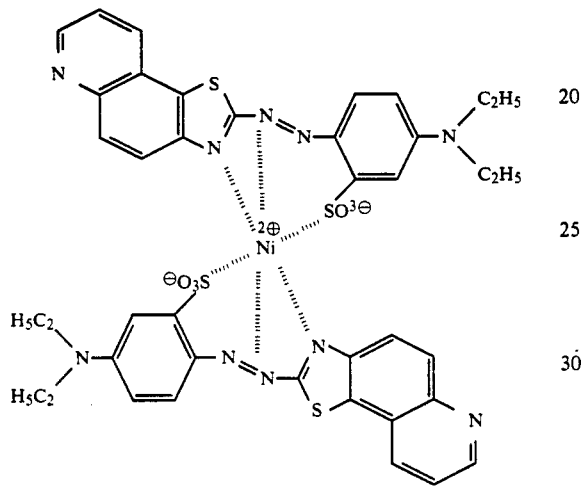

as an azo metal chelate compound were mixed at a weight ratio of 40:60 and used.

The reflectance and the degree of 11T modulation were measured in the same manner as in Example 1, and the results are shown in Table 11.

as an indolenine type cyanine dye, and a compound (Compound No. 19 of Table 3) of the following structural formula:

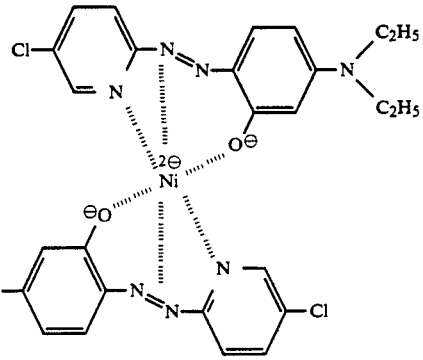

as an azo metal chelate compound were mixed at a weight ratio of 20:80 and used. The reflectance and the degree of 11T modulation were measured in the same manner as in Example 1, and the results are shown in Table 11.

EXAMPLE 16

An optical recording medium was obtained in the same manner as in Example 11 except that a dye of the following structural formula:

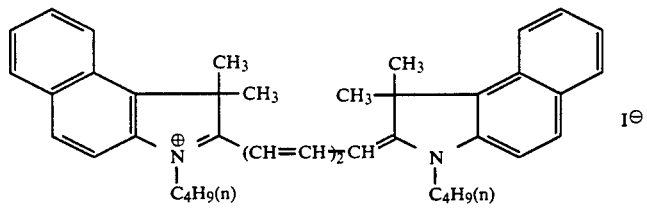

as an indolenine type cyanine dye, and a compound (Compound No. 21 of Table 3) of the following structural formula:

EXAMPLE 15

An optical recording medium was obtained in the same manner as in Example 11 except that a dye of the following structural formula:

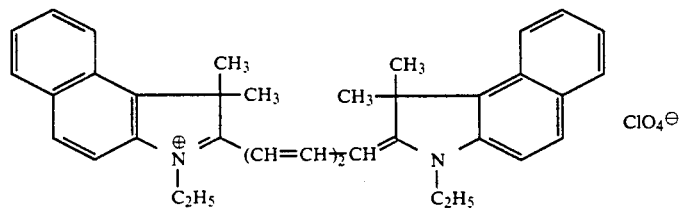

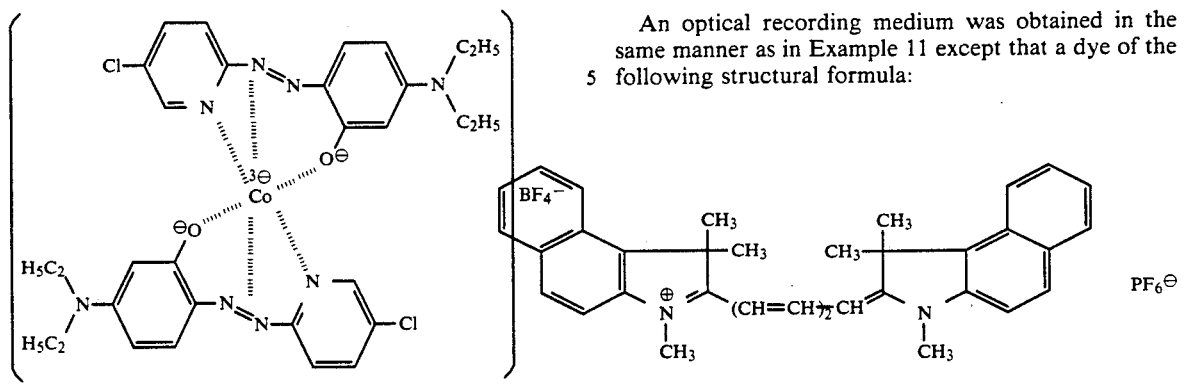

EXAMPLE 17

An optical recording medium was obtained in the same manner as in Example 11 except that a dye of the following structural formula:

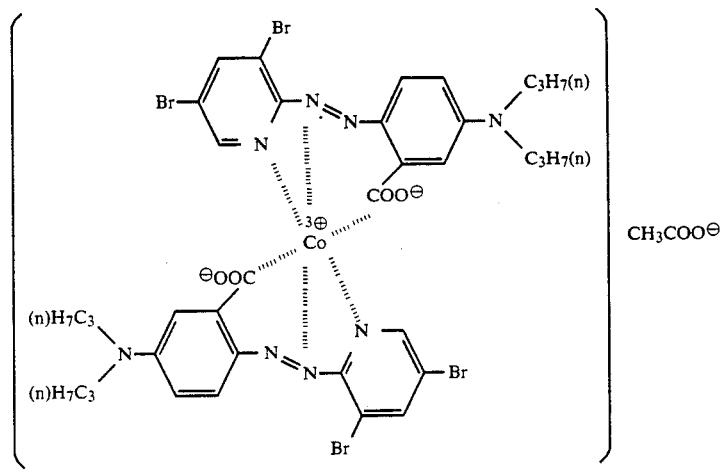

as an indolenine type cyanine dye, and a compound (Compound No. 22 of Table 3) of the following structural formula:

as an azo metal chelate compound were mixed at a weight ratio of 30:70 and used.

The reflectance and the degree of 11T modulation were measured in the same manner as in Example 1, and the results are shown in Table 11.

EXAMPLE 18

An optical recording medium was obtained in the same manner as in Example 11 except that a dye of the following structural formula:

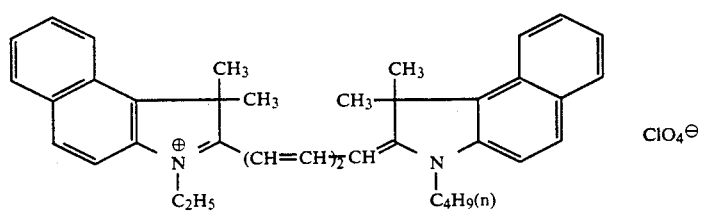

as an azo metal chelate compound were mixed at a weight ratio of 20:80 and used.

The reflectance and the degree of 11T modulation were measured in the same manner as in Example 1, and the results are shown in Table 11.

as an indolenine type cyanine dye, and a compound (Compound No. 22 of Table 3) of the following structural formula:

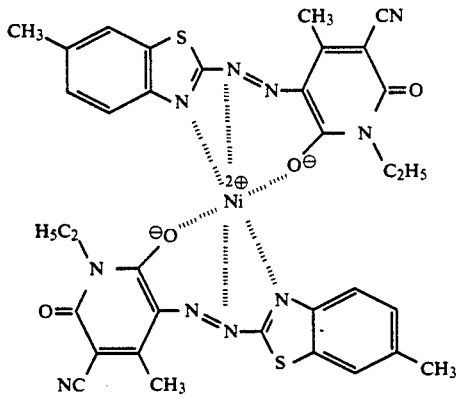

as an azo metal chelate compound were mixed at a weight ratio of 20:80 and used.

The reflectance and the degree of 11T modulation were measured in the same manner as in Example 1, and the results are shown in Table 11.

EXAMPLE 19

An optical recording medium was obtained in the same manner as in Example 11 except that 13 g of methyl lactate was employed instead of 20 g of octafluoropentanol as a coating solvent.

The reflectance and the degree of 11T modulation were measured in the same manner as in Example 1, and the results are shown in Table 11.

EXAMPLE 20

An optical recording medium was obtained in the same manner as in Example 11 except that 11.5 g of 3-hydroxy-3-methyl-2-butanone was employed instead of 20 g of octafluoropentanol as a coating solvent.

The reflectance and the degree of 11T modulation were measured in the same manner as in Example 1, and the results are shown in Table 11.

EXAMPLE 21

A dye-incorporated composition (a weight ratio of 15:85) of 0.10 g of a dye of the following structural formula:

as an indolenine type cyanine dye and 0.62 g of a compound of the following structural formula:

as an azo metal chelate compound was dissolved in 20 g of octafluoropentanol to obtain a 3.6 wt % solution. The solution was dropped on an injection molded polycarbonate substrate having a diameter of 120 mm and a thickness of 1.2 mm with a groove having a depth of 1,900 Å and a width of 0.45 μm, and coated by a spinner method (rotational speed: 500 rpm, 4 minutes). After coating, drying was conducted at 80° C. for 5 minutes to form a recording layer. The, a reflecting layer and a protecting layer are formed on the recording layer in the same manner as in Example 1 to produce an optical recording medium.

The reflectance and the degree of 11T modulation were measured in the same manner as in Example 1, and the results are shown in Table 11.

EXAMPLE 22

An optical recording medium was obtained in the same manner as in Example 21 except that a dye of the following structural formula:

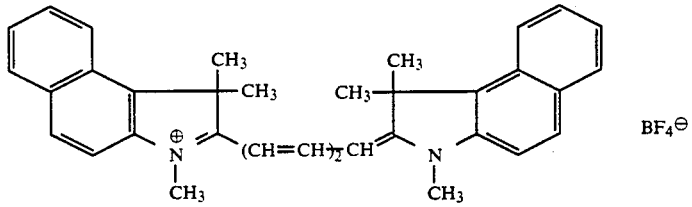

as an indolenine type cyanine dye, and a compound of the following structural formula:

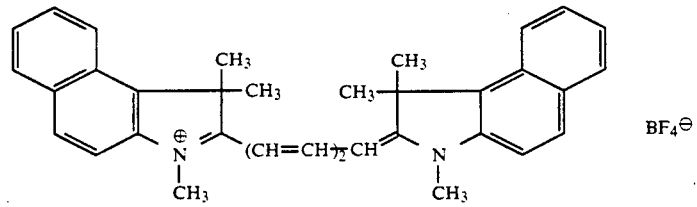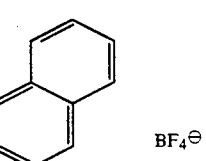

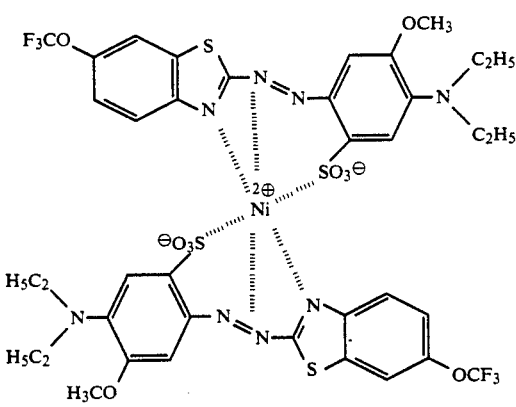

as an azo metal chelate compound were mixed at a weight ratio of 15:85 and used.

The reflectance and the degree of 11T modulation were measured in the same manner as in Example 1, and the results are shown in Table 11.

COMPARATIVE EXAMPLE 5

An optical recording medium was produced in the same manner as in Example 11 except that a recording layer was formed by using only the indolenine type cyanine dye without using the azo metal chelate compound.

The reflectance and the degree of lit modulation were measured in the same manner as in Example 1, and the results are shown in Table 11.

COMPARATIVE EXAMPLE 6

An optical recording medium was produced in the same manner as in Example 13 except that a recording layer was formed by using only the indolenine type cyanine dye without using the azo metal chelate compound.

The reflectance and the degree of lit modulation were measured in the same manner as in Example 11, and the results are shown in Table 11.

COMPARATIVE EXAMPLE 7

An optical recording medium was produced in the same manner as in Example 15 except that a recording layer was formed by using only the indolenine type cyanine dye without using the azo metal chelate compound.

The reflectance and the degree of lit modulation were measured in the same manner as in Example 11, and the results are shown in Table 11.

COMPARATIVE EXAMPLE 8

An optical recording medium was produced in the same manner as in Example 11 except that the indolenine type cyanine dye used in Example 11 and a metal chelate compound of the following structural formula:

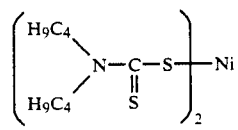

were mixed at a weight ratio of 70:30.

The reflectance and the degree of 11T modulation were measured in the same manner as in Example 11, and the results are shown in Table 11.

TABLE 11

| | Initial value | | After accelerated test | | After repeated reproduction | |
|---|---|---|---|---|---|---|
| | Reflectance (%) | Degree of modulation (%) | Reflectance (%) | Degree of modulation (%) | Reflectance (%) | Degree of modulation (%) |
| Example 11 | 74 | 72 | 83 | 68 | 79 | 69 |
| Example 12 | 69 | 68 | 81 | 63 | 76 | 65 |
| Example 13 | 68 | 67 | 80 | 62 | 75 | 63 |
| Example 14 | 75 | 70 | 83 | 66 | 79 | 67 |
| Example 15 | 66 | 65 | 76 | 62 | 74 | 64 |
| Example 16 | 66 | 65 | 77 | 63 | 74 | 64 |
| Example 17 | 67 | 66 | 74 | 64 | 71 | 65 |
| Example 18 | 71 | 65 | 80 | 61 | 73 | 64 |
| Example 19 | 74 | 71 | 82 | 67 | 78 | 68 |
| Example 20 | 73 | 69 | 82 | 65 | 79 | 67 |
| Example 21 | 71 | 80 | 76 | 78 | 73 | 79 |
| Example 22 | 69 | 82 | 73 | 77 | 71 | 81 |
| Comparative Example 5 | 77 | 75 | 89 | 18 | 84 | 27 |
| Comparative Example 6 | 77 | 72 | 88 | 18 | 86 | 29 |
| Comparative Example 7 | 78 | 74 | 91 | 19 | 86 | 32 |
| Comparative Example 8 | 75 | 69 | 88 | 41 | 82 | 52 |

EFFECTS OF THE INVENTION

Since the dye-incorporated composition of the present invention comprising an indolenine type cyanine dye and a metal chelate compound, shows absorption in the range of 600 to 800 nm and is excellent in the light fastness and the moisture resistance, it can be advantageously used for various optical recording media, electro-photosensitive materials, color liquid crystal display materials, light beam cut filters or the like. Further, an optical recording medium of the present invention using the dye-incorporated composition, is excellent in light stability and causes no light deterioration during reproduction, such being useful.

We claim:

1. A dye-incorporated composition which comprises a mixture of a cyanine dye and an azo metal chelate compound, wherein the azo metal chelate compound is an azo compound of the following formula (I):

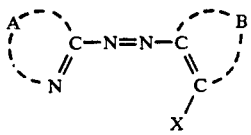

wherein A is a residue forming a hetero ring together with the carbon atom and the nitrogen atom to which it is bonded, B is a residue forming an aromatic ring or a hetero ring together with the two carbon atoms to which is bonded, and X is a group having an active hydrogen, wherein

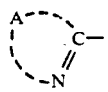

is a thiazole ring, a benzothiazole ring, a pyridobenzothiazole ring, a binzopyridothiazole ring, a pyridothiazole ring, a pyridine ring or a quinoline ring; or a thiazole ring, a benzothioazole ring, a pyridobenzothiazole ring, a benzopyridothiazole ring, a pyridothiazole ring, a pyridine ring or a quinoline ring substituted by an alkyl group, an alkoxy group, an aryloxy group, an aralkyl group, an aryl group, a halogen atom, a cyano group, a nitro group, an ester group, a carbamoyl group, an acyl group, an aclyamino group, a sulfamoyl group, a sulfonamide group, an amino group a hydroxyl group, a phenylazo group, a pyridinoazo group or a vinyl group; and

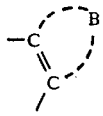

is a benzene ring, a naphthalene ring, a pyridine ring, a pyridone ring, a tetrahydroquinoline ring or a pyrazole ring; or a benzene ring, a naphthalene ring, a pyridine ring, a pyridone ring, a tetrahydroquinoline ring or a pyrazole ring substituted by an alkyl group, an alkoxy group, an aryloxy group, an aralkyl group, an aryl group, a halogen atom, a cyano group, a nitro group, an ester group, a carbamoyl group, an acyl group, an acylamino group, a sulfamoyl group, a sulfonamide group, an amino group, a hydroxyl group, a phenylazo group, a pyridinoazo group or a vinyl group;
chelated with a metal.

2. The dye-incorporated composition according to claim 1, wherein the cyanine dye is an indolenine cyanine dye of the following formula (II):

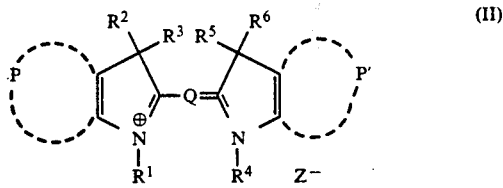

wherein each of P and P' which are independent from each other, is a residue forming an aromatic ring together with the two carbon atoms to which it is bonded, Q is a pentamethine which may have a substituent, each of $R^3$, $R^4$, $R^5$, $R^6$, $R^7$ and $R^8$ which are independent from one another, is an alkyl group which may have a substituent, an aryl group which may have a substituent, an alkenyl group which may have a substituent, or a cycloalkyl group which may have a substituent, and $z^-$ is an anion residue.

3. The dye-incorporated composition according to claim 1, wherein the cyanine dye and the azo metal chelate compound are prepared in the ratio of 5:95 to 95:5 by weight.

4. The dye-incorporated composition according to claim 3, wherein the azo compound is an azo compound of the following formula (III):

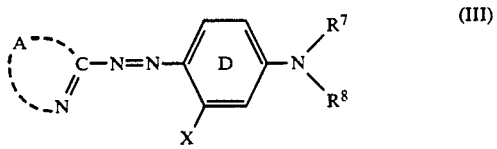

wherein A is a residue forming a hetero ring together with the carbon atom and the nitrogen atom to which it is bonded, each of $R^7$ and $R^8$ which are independent from each other, is a hydrogen atom, an alkyl group which may have a substituent, an aryl group which may have a substituent, an alkenyl group which may have a substituent or a cycloalkyl group which may have a substituent, X is a group having an active hydrogen; and the ring D may have a substituent.

5. The dye-incorporated composition according to claim 4, wherein the azo compound is an azo compound of the following formula (IV):

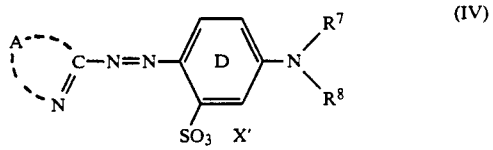

wherein A is a residue forming a hetero ring together with the carbon atom and the nitrogen atom to which it is bonded, each of $R^7$ and $R^8$ which are independent from each other, is a hydrogen atom, an alkyl group which may have a substituent, an aryl group which may have a substituent, an alkenyl group which may have a substituent or a cycloalkyl group which may have a substituent, X' is a hydrogen atom or a cation, and the ring D may have a substituent.

6. The dye-incorporated composition according to claim 3, wherein the azo compound is an azo compound of the following formula (V):

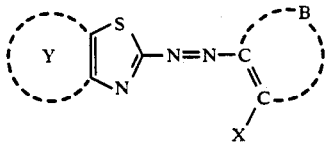

wherein Y is a residue forming an aromatic ring or a hetero ring together with the thiazole ring to which it is bonded, B is a residue forming an aromatic ring or a hetero ring together with the two carbon atoms to which it is bonded, and X is a group having an active hydrogen.

7. The dye-incorporated composition according to claim 6, wherein the azo compound is an azo compound of the following formula (VI):

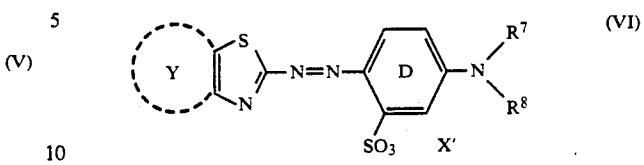

wherein Y is a residue forming an aromatic ring or a hetero ring together with the thiazole ring to which it is bonded, X' is a hydrogen atom or a cation, and the ring D may have a substituent.

8. The dye-incorporated composition according to any one of claims 4 to 7 and 11, wherein the metal forming the azo metal chelate compound together with the azo compound is a transition element.

* * * * *